(12) United States Patent
Armangau et al.

(10) Patent No.: US 8,943,282 B1
(45) Date of Patent: Jan. 27, 2015

(54) MANAGING SNAPSHOTS IN CACHE-BASED STORAGE SYSTEMS

(75) Inventors: Philippe Armangau, Acton, MA (US);
Jean-Pierre Bono, Westborough, MA (US); Sitaram Pawar, Shrewsbury, MA (US); Christopher Seibel, Walpole, MA (US); Yubing Wang, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 358 days.

(21) Appl. No.: 13/433,636

(22) Filed: Mar. 29, 2012

(51) Int. Cl.
*G06F 12/00* (2006.01)
*G06F 13/00* (2006.01)
*G06F 13/28* (2006.01)

(52) U.S. Cl.
USPC .......................... 711/162; 711/126; 711/130

(58) Field of Classification Search
CPC ................ G06F 17/30088; G06F 17/30132
USPC .......................................... 711/126, 130, 162
See application file for complete search history.

(56) References Cited

U.S. PATENT DOCUMENTS

| | | | | |
|---|---|---|---|---|
| 6,748,504 | B2 * | 6/2004 | Sawdon et al. | 711/162 |
| 7,055,009 | B2 * | 5/2006 | Factor et al. | 711/162 |
| 2005/0065986 | A1 * | 3/2005 | Bixby et al. | 707/204 |
| 2006/0265568 | A1 * | 11/2006 | Burton | 711/216 |
| 2007/0260842 | A1 * | 11/2007 | Faibish et al. | 711/170 |
| 2009/0319772 | A1 * | 12/2009 | Singh et al. | 713/153 |

* cited by examiner

*Primary Examiner* — Matthew Bradley
*Assistant Examiner* — Rocio Del Mar Perez-Velez
(74) *Attorney, Agent, or Firm* — Deepika Bhayana; Krishnendu Gupta

(57) ABSTRACT

A method is used in managing snapshot in cache-based storage systems. A request to create a snapshot of a data object is received. A portion of the data object is cached in a global cache. The data object is associated with a mapping object. The mapping object manages access to the portion of the data object. A snapshot of the data object is created. A snapshot mapping object is associated with the snapshot of the data object. The snapshot mapping object includes a link to the mapping object. The snapshot mapping object is a version of the mapping object and shares the portion of the data object cached in the global cache.

16 Claims, 12 Drawing Sheets

MANAGING SNAPSHOTS IN CACHE-BASED STORAGE SYSTEMS

BACKGROUND

1. Technical Field

This application relates to managing snapshots in cache-based storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A write I/O request directed to a file using a "file sync" option (also referred to as "stable write") requires that a write operation directed to the file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

The accuracy and consistency of a file system is necessary to relate applications and data used by those applications. In a data storage system, hundreds of files may be created, modified, and deleted on a regular basis. Each time a file is modified, the data storage system performs a series of file system updates. These updates, when written to a disk storage reliably, yield a consistent file system.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

Although existing various methods provide reasonable means of writing data to file systems stored to a persistent storage, providing access to data of file systems and creating a replica of file systems, they also come with a number of challenges, especially when efficiently creating a snapshot copy of a file of a file system. It may be difficult or impossible for the conventional snapshot copy facility to efficiently create a snapshot copy of a file of a file system when a portion of the file system is cached in a memory of a data storage system.

SUMMARY OF THE INVENTION

A method is used in managing snapshot in cache-based storage systems. A request to create a snapshot of a data object is received. A portion of the data object is cached in a global cache. The data object is associated with a mapping object. The mapping object manages access to the portion of the data object. A snapshot of the data object is created. A snapshot mapping object is associated with the snapshot of the data object. The snapshot mapping object includes a link to the mapping object. The snapshot mapping object is a version of the mapping object and shares the portion of the data object cached in the global cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
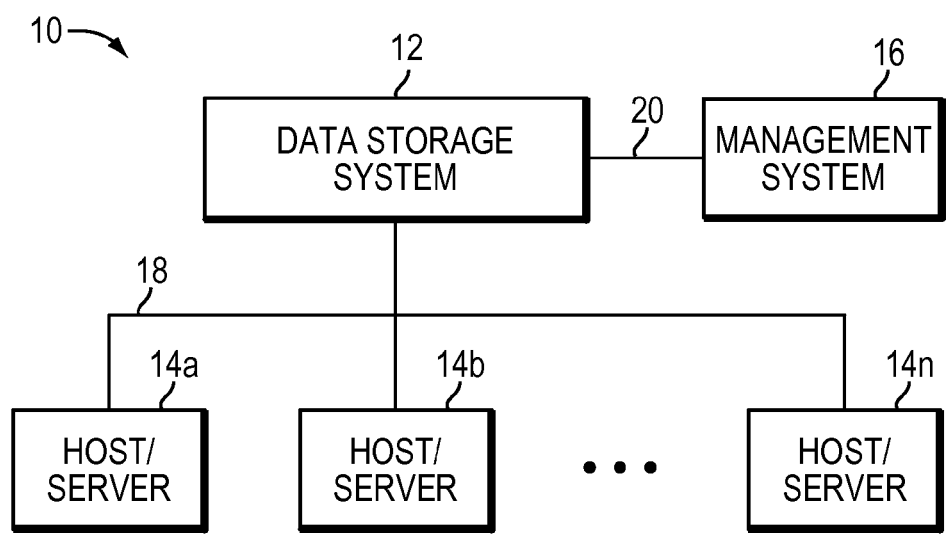
FIGS. 1-3 are examples of an embodiment of a computer system that may utilize the techniques described herein.

Described below is a technique for use in managing snapshots in cache-based storage systems, which technique may be used to provide, among other things, receiving a request to create a snapshot of a data object, where a portion of the data object is cached in a global cache, where the data object is associated with a mapping object, where the mapping object manages access to the portion of the data object, and creating a snapshot of the data object, where a snapshot mapping object is associated with the snapshot of the data object, where the snapshot mapping object includes a link to the mapping object, where the snapshot mapping object is a version of the mapping object and shares the portion of the data object cached in the global cache.

Generally, an I/O operation (e.g., read request, write request) directed to a file may either be a cached I/O or an uncached I/O. Typically, in case of a cached I/O operation, data associated with the cached I/O is cached in a volatile memory (e.g., a buffer cache pool) of a data storage system. In such a case, a write I/O request is executed by writing the data to a buffer of a buffer cache pool and writing the contents of the buffer to a persistent storage either before returning a successful acknowledgement to a client or at a later time based on whether the write I/O request is a stable write request or an unstable write request. Further, in such a case, a read I/O request is executed by reading data from a persistent storage into a buffer of the buffer cache pool if the data is not already cached and completing the read I/O request by reading the data from the buffer. Generally, an uncached interface can be turned on or off per file system as a mount-time option. Further, when a file system is mounted with an option indicating an uncached I/O, a read I/O request is performed in a similar way a read I/O request of a cached I/O operation is performed.

Further, typically a write I/O operation may be a stable write or an unstable write. In case of an unstable write I/O operation, a data storage system does not commit data associated with the unstable write I/O operation to a persistent storage before acknowledging completion of the write I/O request to a client but writes data to an in-memory buffer in a volatile memory cache and flushes the data to the persistent storage at a later time. A process of flushing data includes writing the data to a persistent storage.

Generally, write I/O operations on large file systems often includes modification of existing contents of files of such large file systems, and/or writing data to a portion of a storage that is pre-allocated for such large file systems. Generally, a data transaction log and a global data cache are used to improve I/O performance and decrease write latency of write I/O operations by caching changes to data of a file in the global data cache, logging the changes in the data transaction log, flushing (also referred to herein as "committing") the changes to a storage device at a later time, and recovering the file, if required, by using information stored in the data transaction log. Thus, caching changes to data of a file of a file system and storing the changes in a data transaction log of a data storage system instead of modifying on-disk contents of the file system as part of a write I/O operation enables the data storage system to reduce the number of transaction to a storage disk thereby reducing a write latency of the write I/O operation and increasing I/O performance for a client and/or host system of the data storage system. Further, a data transaction log for a file system is created in a non-volatile memory of a data storage system such that the data transaction log resides with in the address space of the file system thereby allowing an efficient recovery of the file system.

Generally, managing a global data cache improves performance of an uncached write I/O operation (e.g., stable write) such that the uncached I/O operation performs in a similar amount of time that is required for an cached I/O operation to perform. Thus, a data storage system provides a consistent write I/O throughput for a write I/O operation directed to a file system irrespective of the type of the write I/O operation (e.g., stable, unstable) and the type of a file system access protocol used for the write operation. Further, flushing data to on-disk contents of a file system stored on a persistent storage is delayed until a specific criteria (e.g., threshold) is met. Thus, a write latency indicating the amount of time it takes to write data is reduced by delaying writing data to a persistent storage at a later time. Further, committing data to a file system may be performed by one or more background process (e.g. threads). Further, a background process uses buffers cache blocks cached in the global data cache and information of the data transaction log for committing data of the buffer cache blocks to a file system thereby reducing latency of write I/O operations because the data is committed to the storage device after providing acknowledgement of completion of a write I/O request to a client.

Conventionally, when a data storage system receives a request to create a replica of a file of a file system, a portion of data of the file that is cached in a global data cache of the data storage system is first written (also referred to as "flushed") to the file system on a storage device before creating the replica of the file. Thus, in such a conventional system, if a large portion (e.g., gigabytes) of data of a file is cached in the global data cache, creating a replica of the file may take a significant amount of time as writing the portion of data to the file stored on a storage device involves a large number of disk I/O operations which may take a long time to complete. Consequently, in such a conventional system, the amount of time it may take to create a replica of a file may vary based on the amount of data of the file cached in a system cache of a data storage system Further, in such a conventional system, an application that requires access to data of a file can not wait for a cached portion of the file to be first written to a storage device at the time a replica of the file is created.

By contrast, in at least some implementations in accordance with the technique as described herein, the use of managing snapshots in cache-based storage systems technique provides an ability to create a replica of a file without having to flush a cached portion of the file from a global data cache to the file stored on a storage device. In at least some embodiments of the current technique, a delegated reference count mechanism described below herein is used to share a cached portion of a file between the file and a replica of the file. Further, a redirect link is included in a replica of a file for accessing a portion of the file that has not been cached in a global data cache such that a read I/O request for the replica of the file may be redirected to the file. Further, information regarding creation of a replica of a file is stored in a data transaction log in such a way that when the data transaction log is flushed to a storage device at a later time, a redirect link included in the replica of the file is removed.

In at least some implementations in accordance with the technique as described herein, the use of the managing snapshots in cache-based storage systems technique can provide one or more of the following advantages: improving memory and storage utilization by creating a snapshot copy of a file without having to flush a cached portion of the file to a storage device and improving response time of applications by efficiently creating replicas of files.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
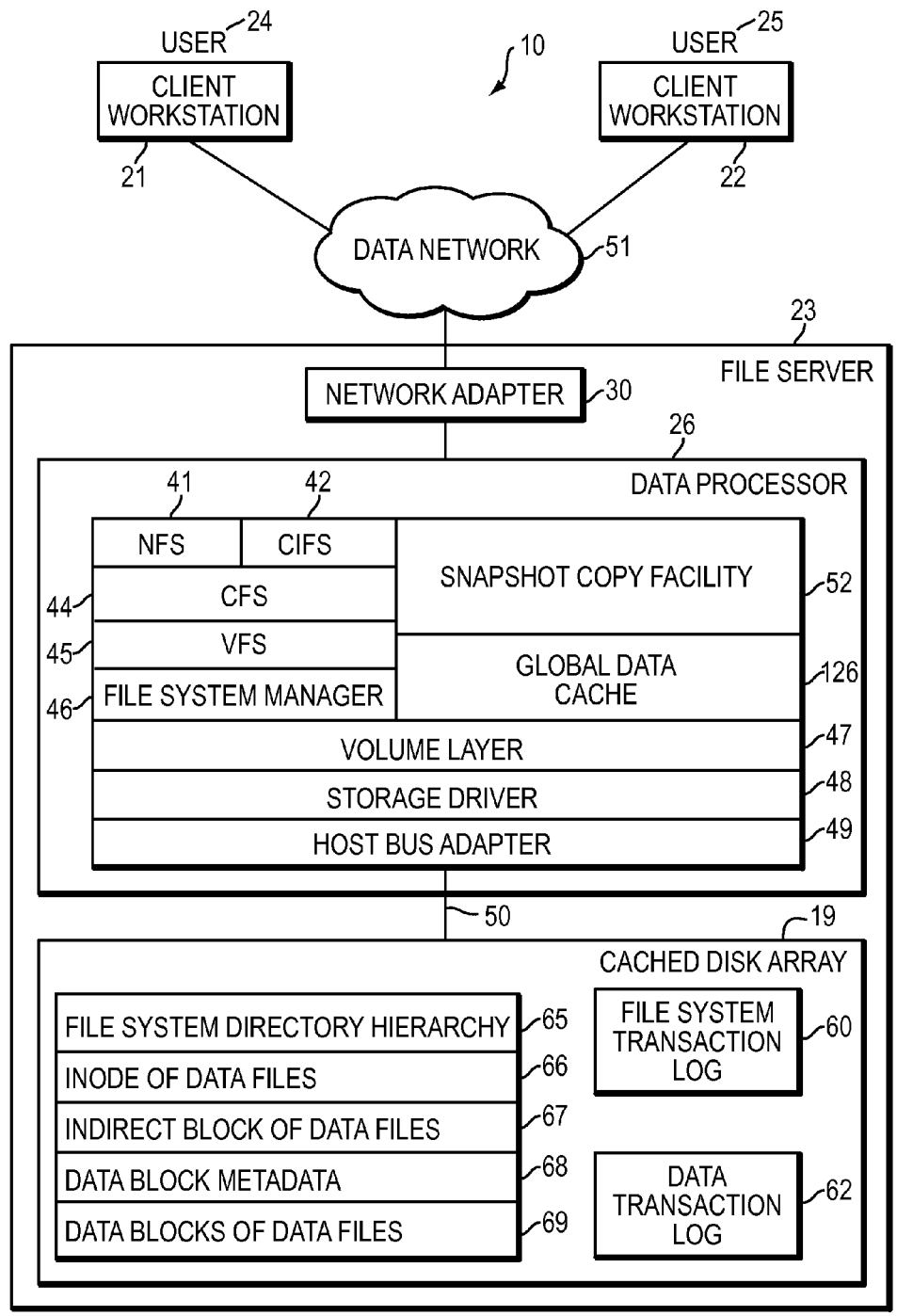

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. In at least one embodiment of the current technique, global data cache 126 stores data of a file of a file system in a volatile memory of data storage system 10.

In at least one embodiment of the current technique, global data cache 126 is initialized at the time file server 23 is initialized. The global data cache 126 is created in a volatile (e.g., Direct Random Access Memory (DRAM) of file server 23. Further a data transaction log 62 is created for each file system when storage for the file system is provisioned. The data transaction log is created in a nonvolatile memory of file server 23. Further, in at least one embodiment of the current technique, a nonvolatile memory may include a flash memory (e.g. solid state drives, EEPROM (electrically erasable programmable read-only memory)).

Figure 3:
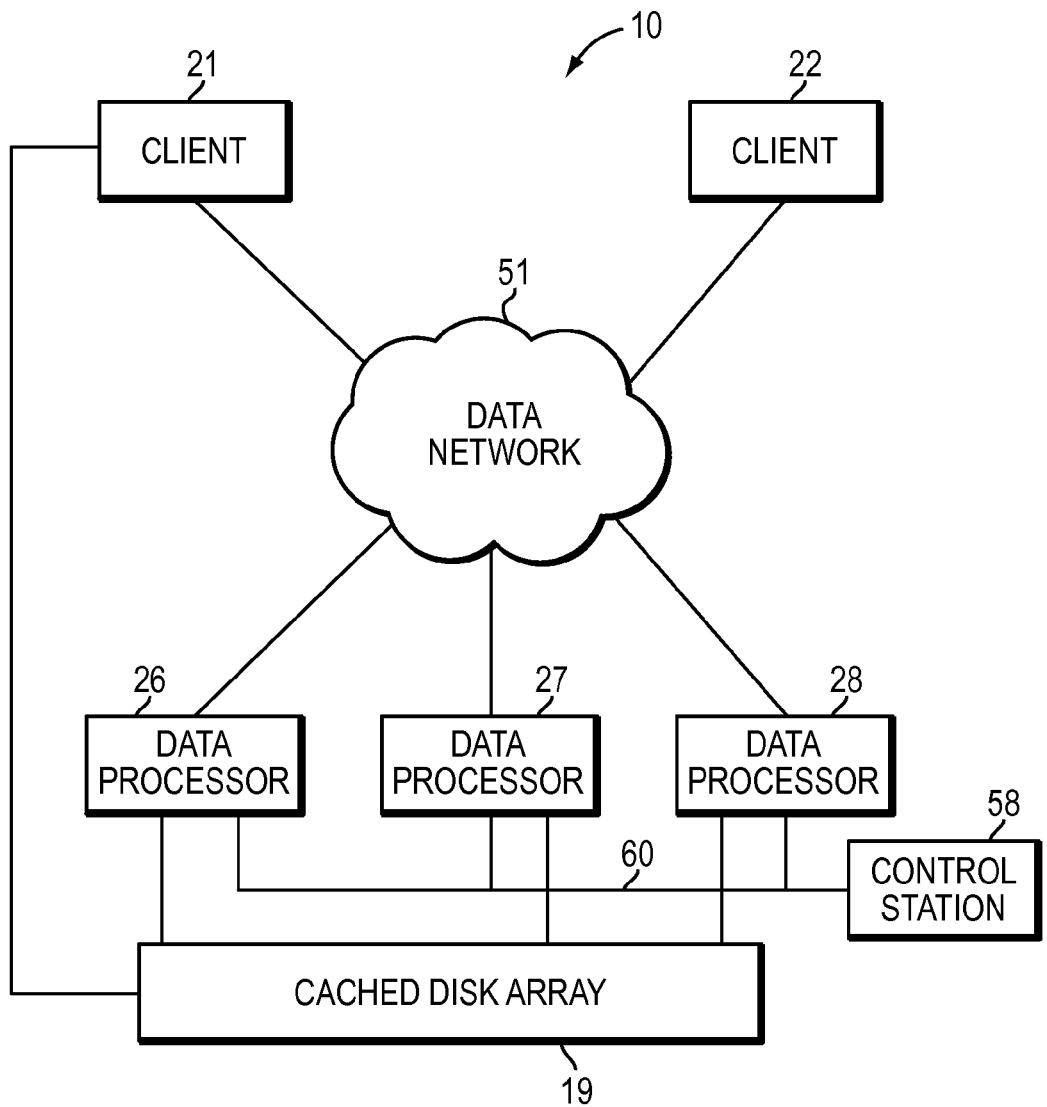

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
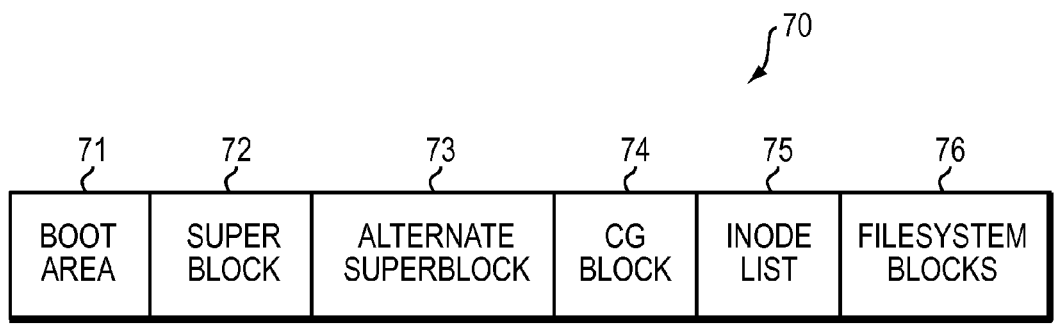
FIGS. 4-12 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism A file is uniquely identified by a file system identification number in file server 23. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log for a file system offers increased reliability, because the file system transaction log may replicate some or all of the file system metadata which can be applied to the file system at a later time in order to make the file system metadata consistent with changes applied to data of the file system.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block. Further, a mapping pointer of a file system block includes metadata information for the file system block such as a weight that indicates a delegated reference count for the mapping pointer. The delegated reference count is used by the snapshot copy facility 52 when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

With reference also to FIG. 1, as introduced above herein, the file-system based snapshot copy facility 52 needs a way of maintaining block ownership information for indicating whether or not each indirect block or data block of a file or a snapshot copy ("replica" or "version") of the file is shared with another version of the file. This block ownership information is accessed each time that the snapshot copy facility 52 writes new data to a file, and each time that the snapshot copy facility 52 deletes a snapshot copy. Further, as introduced above, files in the data storage system 10 are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information for a snapshot copy facility 52 is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Figure 5:
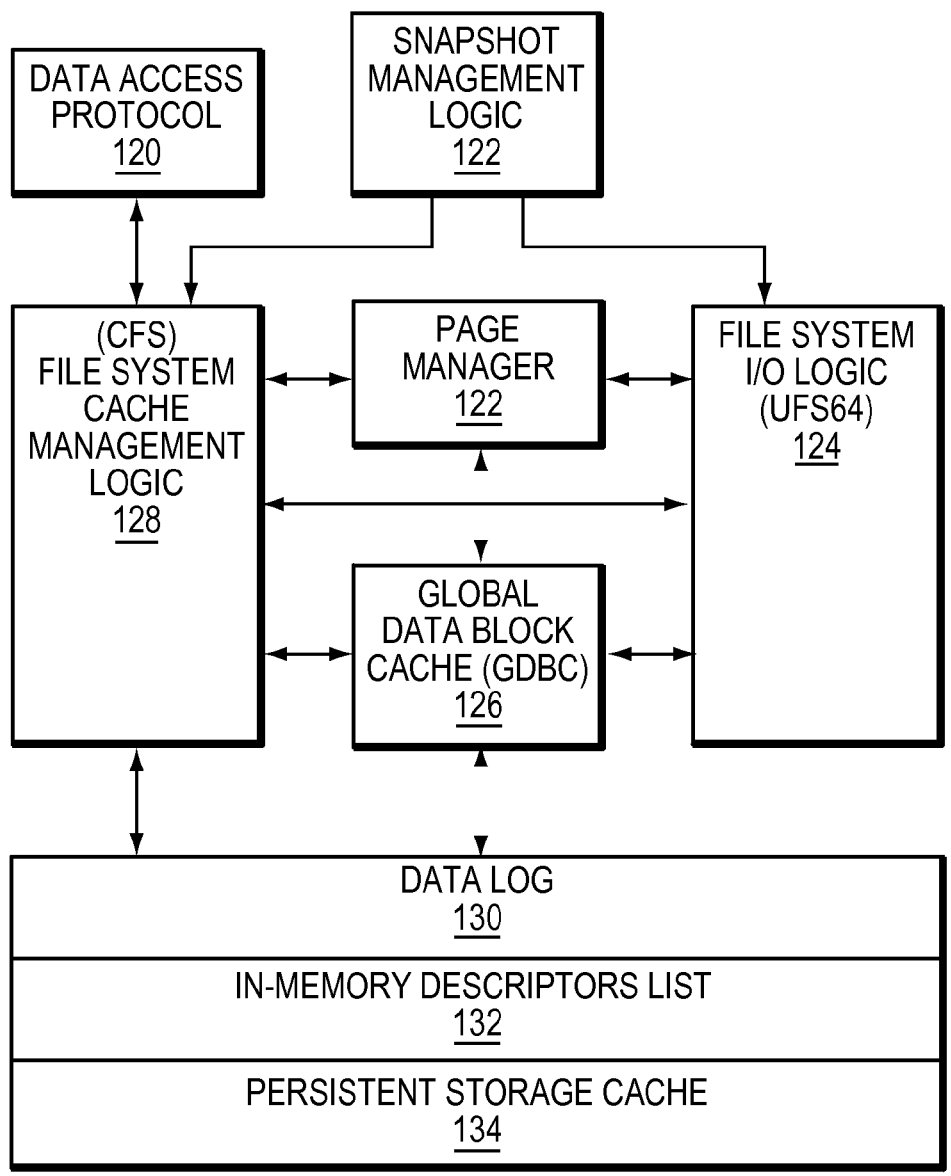

Referring to FIG. 5, shown is a detailed representation of components that may be included in an embodiment using the techniques described herein. In at least one embodiment of the current technique, a client access a file system using any one of data access protocols 120 (such as CIFS 42, NFS 41, and iSCSI 51) by issuing an I/O request (e.g., read, write) to the file system. With reference also to FIGS. 1-4, file system I/O logic 124 (also referred to herein as "UFS64") provides functionality for creating and hosting a file system in a data storage system. Further, file system I/O logic 124 provides a set of interfaces for accessing and managing files of a file system, and maintaining consistent mapping for the files of the file system. File system cache management logic 128 (also referred to herein as "Common File System" or "CFS") provides a functionality and a set of interfaces for accessing and managing files of a file system. CFS 128 includes mapping information that maps an offset of a file to a global data block cache descriptor associated with a data block that is cached in the global data block cache 126. Further, CFS 128 manages sharing of a data lock that is cached in global data block cache 126 by using the delegated reference counting mechanism.

In at least one embodiment of the current technique, file server 23 includes a volatile memory module that can be viewed as an array of pages as the volatile memory is apportioned into fixed size frames, or pages, for organizational purposes. The terms 'frame' and 'page' will be used interchangeably herein. For example, in at least one embodiment of the current technique, the volatile memory may be apportioned into pages of 8 kilobytes (KB). Alternatively, in another embodiment of the current technique, the volatile memory may be apportioned into pages of 4 kilobytes (KB). Further, in another embodiment of the current technique, the volatile memory may be apportioned into pages of 4 megabytes (MB).

A first portion of the pages of the volatile memory module are allocated to data structures that are used to support an operating system of the file server 23. A second portion of the pages of the volatile memory module are allocated to a buffer cache pool, where the buffer cache pool includes a collection of buffer cache blocks such that each buffer cache block may correspond to a page of the volatile memory.

The remaining pages of the volatile memory module are so-called 'free' pages available for allocation to applications. The file server 23 communicates with clients coupled to the file server via network interface 30. Clients execute applications which access file systems stored on storage devices via the file server 23. A storage device on which a file system is stored is apportioned into fixed size file system blocks, for organizational purposes.

A file system contains a range of file system blocks that store metadata and data. File system blocks are allocated from a storage device for creating files and storing metadata of a file system. In at least some embodiments of the current technique, the file system block may be 8 kilobyte (KB) in size. Thus, in at least one embodiment of the current technique, there may exist 1-1 correspondence between a file system block and a page. However, it should be noted that there may not be a 1-1 correspondence between a file system block and a page.

Thus, the buffer cache pool of a data storage system is created by apportioning a portion of a volatile memory module of the data storage system into buffer cache blocks (also referred to as "buffer cache page") in such a way that each buffer cache block is represented by a buffer cache descriptor. The buffer cache pool is created when file server 23 is initialized during a boot sequence. Further, during initialization of file server 23, a buffer cache descriptor table is created for managing buffer cache blocks of the buffer cache pool. The buffer cache descriptor table includes a buffer cache descriptor entry for each buffer cache block created for the buffer cache pool. A buffer cache descriptor entry associated with a buffer cache block includes information about the buffer cache block. The information may include the physical address of the buffer cache block, as well as an identifier of a buffer cache queue to which the buffer cache block is allocated. The buffer cache pool provides buffer cache blocks to applications for storing data and/or metadata of a file system. The buffer cache pool manages allocation, caching and deallocation of buffer cache blocks.

In at least one embodiment of the current technique, page manager 122 allocates pages of the volatile memory module and provides the pages to applications. An application may require one or more pages of memory. Page manager 122 provides a common set of interfaces for accessing buffer cache blocks of the buffer cache pool.

In at least one embodiment of the current technique, global data block cache 126 ("GDBC") caches a set of data blocks of a file system in a volatile memory of file server 23 by managing a set of global data block cache descriptors ("also referred to herein as "GDBC descriptor") such that each global data block cache descriptor may be mapped to a buffer cache block of the buffer cache pool such that the buffer cache block may store a data block of the set of data blocks. Thus, a GDBC descriptor entry functions in a similar way a buffer cache descriptor entry functions as described above herein. Further, a data block of a file of a file system that is cached in the GDBC 126, may also be stored in a persistent journal such as data transaction log 130 associated with the file system in a case where the data block is a dirty data block indicating that the dirty data block has not been flushed to a storage device yet. The data transaction log 130 is stored in a nonvolatile memory module that is persistent across reboots of file server 23. Further, GDBC 126 provides CFS 128 and file system I/O logic 124 consistent access to a set of data blocks cached in the buffer cache pool. Further, GDBC 126 uses a reference count mechanism and a hint mechanism for managing a set of buffer cache data blocks. Further, the size of global data block cache 126 is based on the size of the volatile memory module of file server 23.

In at least one embodiment of the current technique, data transaction log 130 provides a functionality for logging a set of data blocks associated with write I/O requests to a file system such that the set of data blocks are stored in a nonvolatile memory of file server 23. Further, data transaction log 130 provides a set of interfaces for storing a data block in a nonvolatile memory and maintaining a data log descriptor associated with the data block in a volatile memory of file server 23. Further, data transaction log 130 provides a common set of interfaces for accessing a set of data blocks of a file system irrespective of how the file system is implemented in a data storage system. Further, data transaction log 130 enables file server 23 to recover a file system when the file system is remounted. A file system may be remounted either after reboot of file server 23 or after successful unmount of the file system. Thus, in-memory descriptors list 132 manages a set of data log descriptors associated with a set of data blocks that are cached in a nonvolatile memory (such as persistent storage cache 134).

Further, in at least one embodiment of the current technique, data transaction log 130 provides a functionality to cache data of a file system in a nonvolatile memory of a data storage system such that the data storage system may be a file based data storage system or a block based data storage system. In case of a block based data storage system, data transaction log 130 may use a persistent storage such as a storage processor cache for storing contents of a file system. In case of a file based data storage system such as file server 23, a predefined address space of a file system is reserved for data transaction log 130. The storage for the predefined address space may be provisioned from a file system volume. Further, data stored in data transaction log 130 persists across reboots of a data storage system. Additionally, a data transaction log is associated with a single file system. Thus, data transaction log 130 is available for caching contents of a file system when the filesystem is mounted because the data transaction log is part of the address space of the file system.

In at least one embodiment of the current technique, snapshot management logic 122 creates a replica of a file of a file system without having to flush a portion of the file cached in global data block cache 126 to a persistent storage. In such a case, the cached portion of the file is shared between the file and the replica of the file such that a read request for the cached portion is performed by reading data cached in the global data block cache 126.

Generally, if a file system data block stored on a persistent storage includes an updated version of data compared to data stored in an in-memory buffer (e.g., a buffer cache block of a buffer cache pool) associated with the file system data block, the in-memory buffer is indicated as dirty buffer (also referred to herein as "dirty metadata buffer). Thus, in such a case, contents of the dirty in-memory buffer are flushed to the persistent storage at a later time in order to ensure that a single location on the persistent storage stores the up-to-date data for the file system data block. Typically, a dirty buffer results from an unstable (also referred to as "asynchronous") write operation. Further, a background process is used to flush dirty in-memory buffers created by asynchronous concurrent write I/O operations thereby reducing latency of the asynchronous write I/O operations.

The process of flushing data commits the data from dirty in-memory buffers that are cached in file system cache 128 to a file system stored on a persistent storage. A new overlapping write I/O request to any one of the dirty buffers may generate a copy of the dirty buffer to which the overlapping write I/O request is targeted to. Then, the new overlapping write I/O request updates the copy of the dirty buffer in order to ensure that only the data that has been acknowledged to a client is written to the persistent storage.

Figure 6:
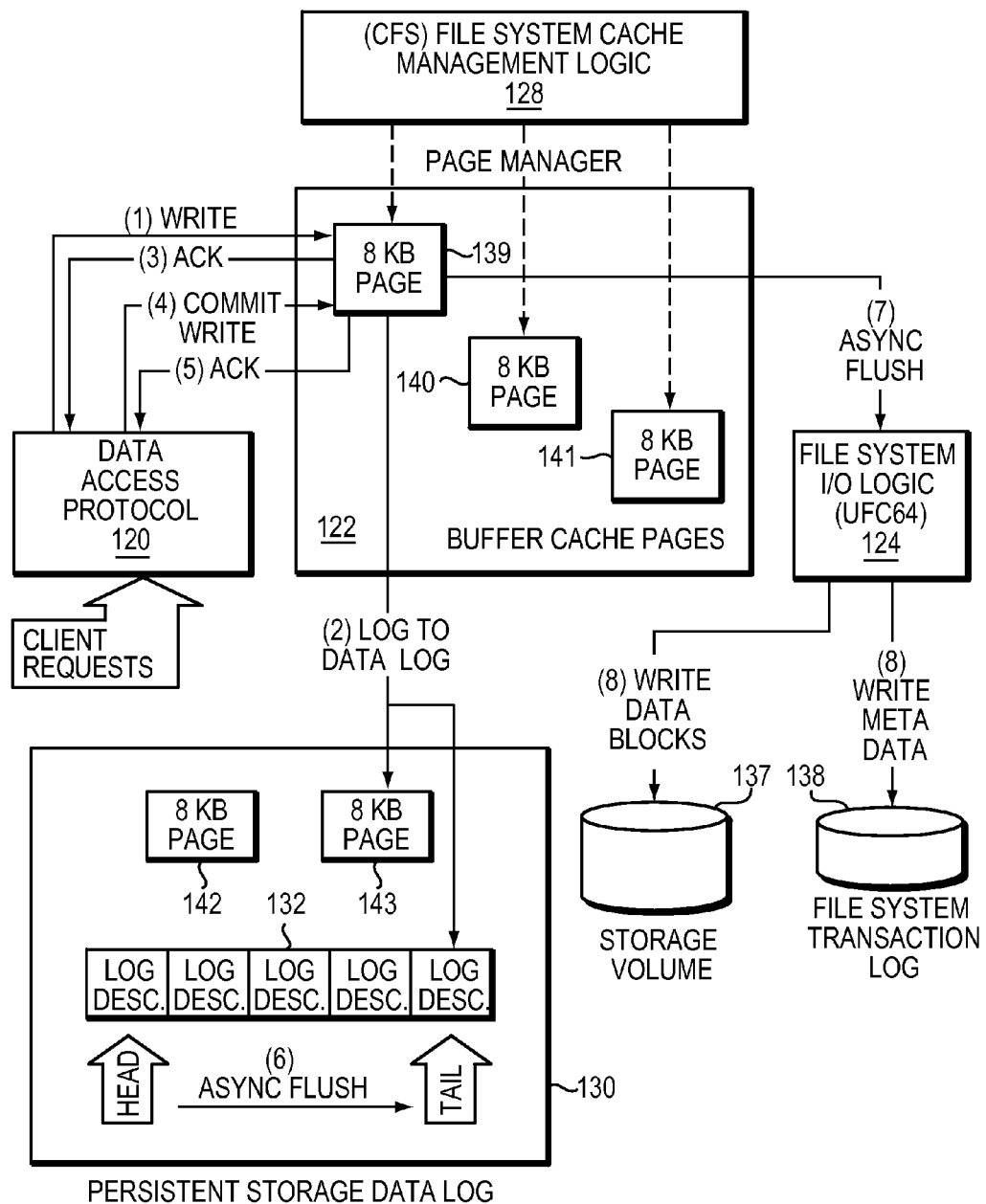

Referring to FIG. 6, shown is a detailed representation of components that may be included in an embodiment using the techniques described herein. A client issues an I/O request (e.g., read, write) to a file system using a data access protocol 120 (such as CIFS 42, NFS 41). The I/O request may attempt to modify on-disk contents of a file of the file system. In such a case, writing data associated with an I/O request to a data transaction log stored on a persistent storage created from the fastest storage devices available and acknowledging the I/O request to a client before writing data to the file stored on a storage device and metadata to a file system transaction log shifts the overhead involved in writing to the storage device and the file system transaction log to a background process which executes separate from the I/O request. Further, in at least one embodiment of the current technique, a background process (also referred to as "flush process") commits data and/or metadata to the file system at a later time.

Thus, for example, in FIG. 6, after receiving the I/O request from the client, data associated with the I/O request (e.g., write) is cached in a buffer cache block 139 of the buffer cache pool. Further, the data is written to a data block 142 and stored in a data transaction log 130 associated with the file system. Further, information regarding the data block 142 and the buffer cache block 139 is stored in a global data block cache descriptor. Additionally, a data log descriptor 132 is created and associated with the global data block cache descriptor. Further, the data log descriptor 132 is added to a list of log descriptors that are flushed by a background process at a later time. The client sends the request for an acknowledgement of completion of the I/O request, and the request to commit the data to a storage device. The data storage system provides the acknowledgement to the client indicating that the I/O request has completed successfully. After providing the acknowledgment, a background flush process writes the data cached in the buffer cache block 139 to the storage device 137. The background flush process may be executed at a specified time based on a criteria such as a threshold value. The background flush process writes data stored in the buffer cache block 139 to the storage volume 137 and writes metadata associated with the data to file system transaction log 138.

Conventionally, if a request to create a snapshot copy of the file system is received before the background flush process writes the data cached in the buffer cache block 139 to the storage device 137, the data storage system 12 must flush the data cached in the buffer cache block 139 to the storage device 137 before creating the snapshot copy of the file system. Thus, in such a conventional system, creating a snapshot copy of a file system may take a significant amount of time based on the amount of data of the file system cached in buffer cache blocks.

By contrast, in at least one embodiment of the current technique, data storage system 12 does not flush the data cached in the buffer cache block 139 to the storage device 137 before creating the snapshot copy of the file system. Further, the buffer cache block 139 is shared between the snapshot copy of the file system and the file system by using the delegated reference counting mechanism as described above herein.

Further, in a least one embodiment of the current technique, a data log descriptor is associated with a global data block cache descriptor and the global data block cache descriptor is associated with the buffer cache block. As a result, a data storage system uses data log descriptor to determine buffer cache data blocks cached in the global data cache that are required to be flushed to a storage device.

Figure 7:
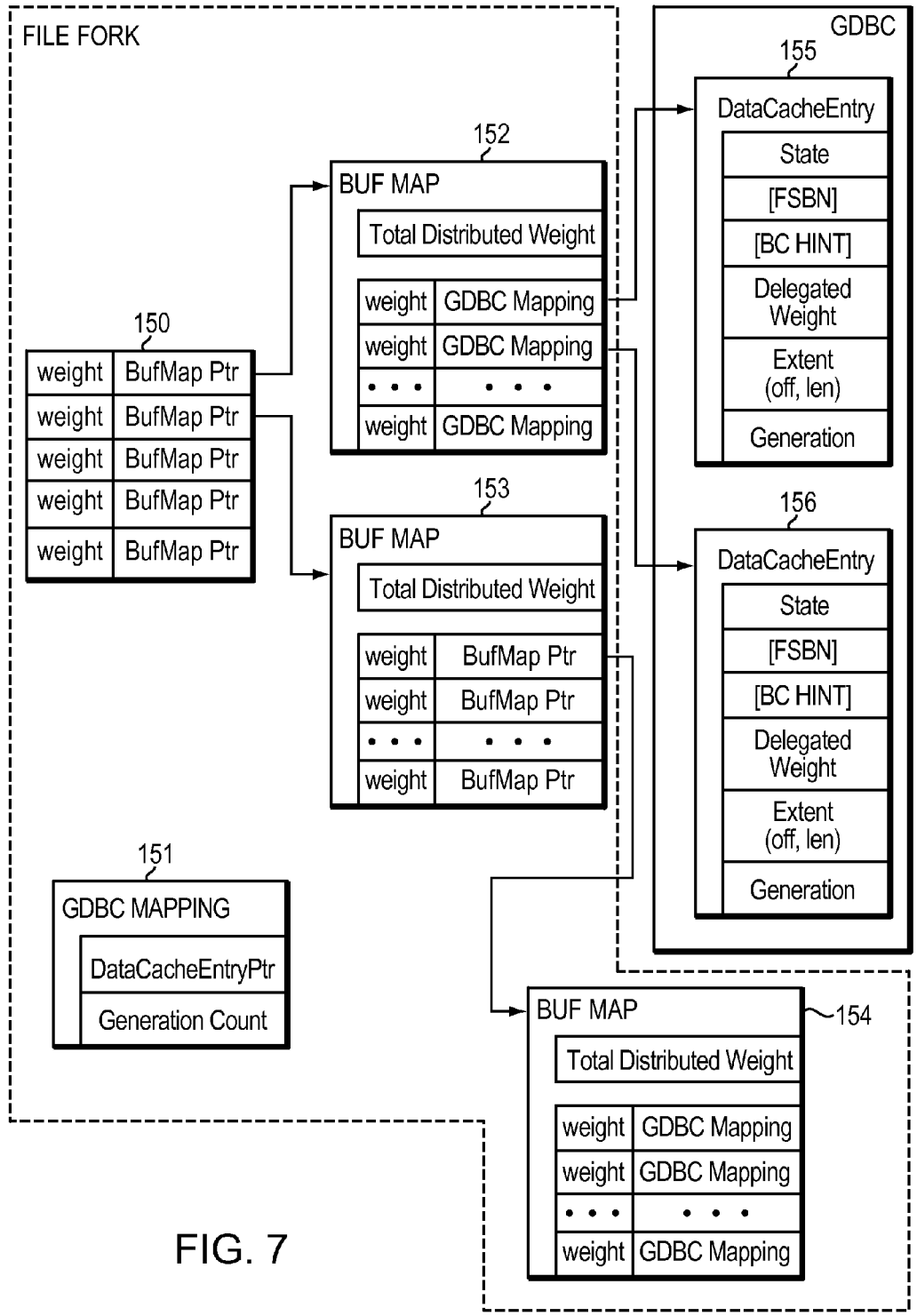

Referring to FIG. 7, shown is a detailed representation of components that may be included in an embodiment using the techniques described herein. With reference also to FIG. 6, a file fork object is created in a memory of a data storage system for each file of a file system. A file fork object associated with a file includes a hierarchal list 150 of pointers such that each pointer of the hierarchical list 150 points to a buffer mapped object (also referred to herein as "bufmap"). The hierarchical list 150 (also referred to as "bufmap table") is indexed based on a logical block number for a file. The first entry in the bufmap table 150 points to a level-1 bufmap object 152 (also referred to herein as "leaf bufmap object") that includes a set of entries such that each entry includes a delegated weight and a mapping to a global data block cache descriptor cached in the global data block cache 126. The second entry of the bufmap table 150 points to a level-2 bufmap object 153 that includes a set of entries such that each entry includes a delegated weight and a pointer to a level-1 bufmap object (e.g., a leaf bufmap object). For example, the first entry of the set of entries 153 points to leaf bufmap object 154 which further includes a set of entries, each entry of the set of entries including a mapping to a global data block cache descriptor cached in the global data block cache 126. A mapping stored in an entry of a leaf bufmap object includes information such as a pointer to a global data block cache descriptor and a generation count. The pointer to a global data block cache descriptor includes a NULL pointer if a buffer cache block associated with the global data block cache descriptor is not cached in the global data block cache 126 and/or a data transaction log. Each entry of the bufmap table 150 is updated when a data block of a file is cached in the global data block cache upon receiving an I/O (e.g., write) request. Thus, in at least one embodiment of the current technique, a file fork object maintains an in-memory list of GDBC descriptor entries such that each GDBC descriptor entry points to a buffer cache block cached in global data block cache 126.

Figure 8:
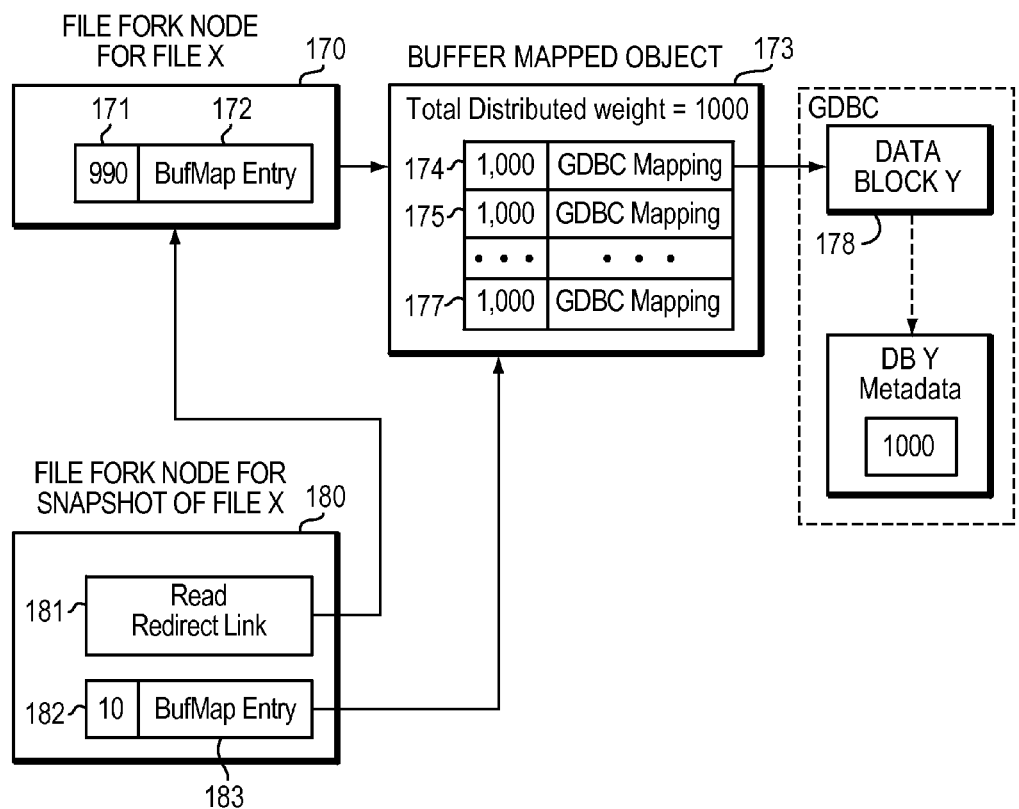

Referring to FIG. 8, shown is a detailed representation of components that may be included in an embodiment using the techniques described herein. With reference also to FIGS. 5-7, in at least one embodiment of the current technique, file system cache management logic 128 includes an in-memory file fork object for each file of a file system of a data storage system. For example, in FIG. 8, a file fork object 170 represents a file named "file-X". Each file fork object includes information regarding global data block cache descriptors such that each global data block cache descriptor is associated with a buffer cache block that is cached in the buffer cache pool provided by page manager 122. Thus, a file fork object of a file system indicates a portion of the file system cached in global data block cache 126

In at least one embodiment of the current technique, the delegated reference counting mechanism is applied to a file fork object of a file (also referred to as "primary file" or "working file") and a buffer mapped object included in the file fork object in order to share buffer cache blocks cached in global data block cache 126 and referenced by the file fork object. Initially, a fully weighted reference count is assigned to each buffer mapped object of a file fork object. Thus, buffer mapped objects of a file fork object of a file are owned by the file fork object indicating that no sharing relationship exists at the time the file fork object is created in a memory of a data storage system. Further, in order to share contents of each buffer mapped object of a set of buffer mapped object of a file fork object between the primary file and a snapshot copy of the primary file, initially a fully weighted reference count is assigned to each GDBC mapping field in the buffer mapped object and a buffer cache block pointed to by the GDBC mapping based on the delegated reference counting mechanism.

Referring back to FIG. 8, for example, in at least one embodiment, a file (e.g., file "X") is associated with file fork object 170. The file fork object 170 includes a delegated reference count for each buffer mapped entry of file fork object 170, and information regarding whether a set of buffer cache blocks referenced by each buffer mapped entry is shared by snapshot copies of the file. For example, buffer mapped entry 172 of file fork object 170 includes delegated reference count 171 associated with the parent-child relationship indicated by the buffer mapped object entry 172 and buffer mapped object 173. In the example of FIG. 8, delegated reference count 171 has an initial full-weight value of 1,000. Buffer mapped object 173 pointed to by buffer mapped entry 172 stores a set of GDBC mapping that refers to a set of buffer cache blocks cached in global data block cache 126 such that the set of buffer cache blocks store a portion of data of the file. Further, the total distributed weight of the buffer mapped object 173 has an initial full-weight of 1,000. Initially, at the time the file fork object 170 is created, buffer cache blocks referenced by buffer mapped entry 172 are owned by file fork object 170 of the file indicating that no sharing relationship exists at that point in time. Further, a buffer mapped object includes sharing information (e.g., shared bit, shared status) indicating whether the buffer mapped object is shared by two or more file fork objects. The sharing information of a buffer mapped object is used based on the delegated reference counting mechanism described above herein. However, it should be noted that for simplicity, the sharing information is not shown in FIGS. 7-9.

Further, shared information (not shown in FIG. 8) for buffer mapped entry 172 indicates that the buffer mapped object 173 is owned by the file fork object 170 of primary file and is not shared by any other file or snapshot copies of the file. Each entry of the buffer mapped object 173 includes a GDBC mapping that refers to a buffer cache block cached in global data block cache 126. For example, an entry 174 stores information regarding buffer cache block 178 that stores contents of a file system data block (e.g., "data block Y"). The entry 174 includes a delegated reference count for the buffer cache block 178 such that the distributed weight included in the buffer cache block 178 is equivalent to the initial delegated reference count stored in entry 174. In the example of FIG. 8, the delegated reference count for buffer cache block 178 has an initial full-weight value of 1,000. Similarly, entries 175, 177 stores information regarding other buffer cache blocks of the set of buffer cache blocks cached in global data block cache 126.

In at least one embodiment of the current technique, when a file fork object of a primary file is shared with a snapshot copy of the primary file by creating a version of the file fork object using the delegated reference counting mechanism, the entire hierarchy of parent-child relationships starting from the file fork object of the primary file is assumed to inherit the sharing status indicated by sharing information (not shown in FIG. 8) stored in the file fork object.

In at least one embodiment of the current technique, a snapshot copy of the primary file (e.g. file "X") is created by creating a snapshot copy (or "version") of the file fork object 170 of the primary file using the delegated reference counting mechanism described above herein. When the snapshot copy facility 52 creates a snapshot copy of the primary file, the snapshot copy facility 52 allocates a snapshot inode on a storage device for the snapshot copy, creates a snapshot file fork object in memory and copies the contents of the primary file fork object 170 into the snapshot file fork object 180. Further, the snapshot copy facility 52 decrements the delegated reference count 171 in buffer mapped entry field of the primary file fork object 170 by a partial-weight value of 10, and sets the delegated reference count 182 in the buffer mapped entry field of the snapshot file fork object 180 to the same partial-weight value of 10. Thus, the total distributed weight of buffer mapped object 173 which is total of the delegated reference count 171 of the primary file fork object 170 and delegated reference count 182 of the snapshot file fork object 180 stays same with the value of 1,000. Buffer mapped entry 183 included in the snapshot file fork object 180 for the snapshot copy of the primary file is updated to point to the same buffer mapped object 173, and thus indicates that buffer mapped object 173 is shared by the primary file and the snapshot copy of the primary file. Further, sharing information in the primary file fork object 170 is updated to indicate that the buffer mapped object 173 is shared by the primary file and the snapshot copy of the primary file, which in turn implies that the set of buffer cache blocks cached in global data block cache 126 for the primary file that are referenced by a set of GDBC mappings included in the buffer mapped object 173 are shared by the primary file and the snapshot copy of the primary file.

Further, in at least one embodiment of the current technique, a snapshot file fork object associated with a snapshot copy of a file includes a read redirect link (also referred to simply as "redirect link") pointing to a file fork object associated with the file such that a read access to data of the file is redirected to the file fork object associated with the file. For example, in FIG. 8, read redirect link 181 included in the snapshot file fork object 180 refers to file fork object 170 such that a set of GDBC mappings included in each buffer mapped object of file fork 170 may be accessed by the snapshot file fork object 180.

Generally, a write split operation based on the delegated reference counting mechanism is invoked upon receiving a write I/O request for a data block. The write split operation is described in U.S. Pat. No. 8,032,498 for "Delegated reference count base file versioning" issued Oct. 4, 2011, which is incorporated herein by reference. The write split operation evaluates the shared bit stored in the mapping pointer for the data block to check whether the data block has been shared after application of the snapshot copy facility 52. If the shared bit indicates that the data block has been shared among versions of a file, the write split operation breaks the sharing relationship of the data block and allocates a new data block for the write I/O request. If the mapping pointer that points to the data block resides in a shared indirect block, the sharing relationship of the indirect block is also broken. In such a case, the write split operation causes a new indirect block to be allocated and mapping pointers for all data blocks not involved in the write operation are copied to the new indirect block. The process of copying mapping pointers to the new indirect block includes distributing the delegated reference count values of mapping pointers between the original shared indirect block and the newly allocated indirect block. In addition to the distribution of the delegated reference count values, the shared bits of the copied mapping pointers are updated to indicate that the sharing relationship has been broken. Any reference to the old data block is released and the mapping pointer of the new data block is updated to point to the newly allocated data block. If the shared bit of the data block indicates that the data block has not been shared among versions of a file, contents of the data block are updated according to the write I/O request and the write I/O requests completes.

Figure 9:
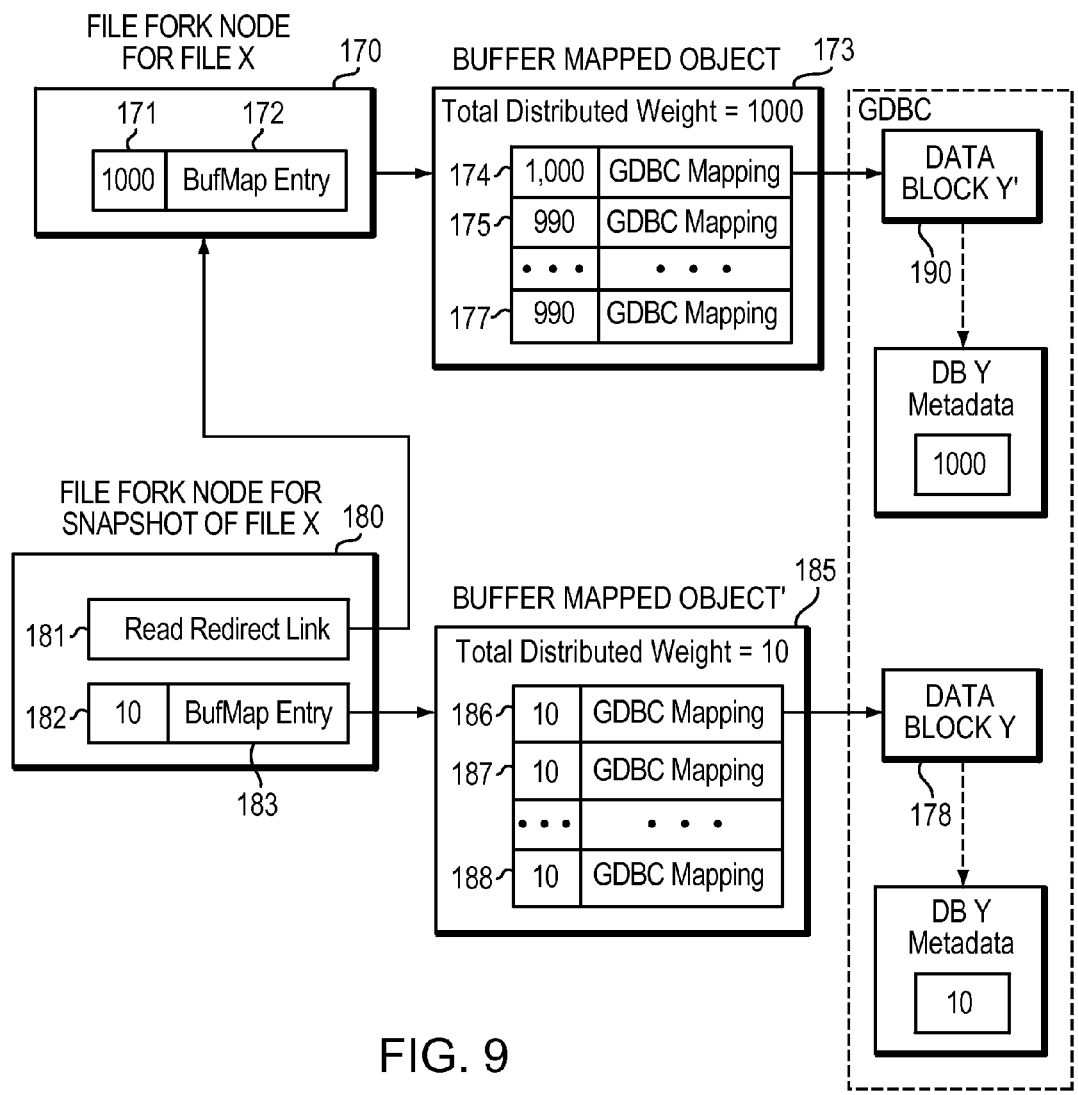

Referring to FIG. 9, shown is an illustration of an example representing an update to a buffer cache block cached in a global data block cache and shared between a primary file and a snapshot copy of the primary file of FIG. 8 that may be included in an embodiment using the techniques described herein. If a buffer cache block is shared by a file fork object associated with a primary file and a snapshot copy of the file fork object and contents of the buffer cache block are updated by a write I/O operation, the write operation results into change in the contents of the buffer cache block. Thus, in order to update the buffer cache block and preserve the sharing relationship of the buffer cache block and the buffer mapped object referring to the buffer cache block included in the file fork object, a file fork split operation is performed. Similar to the write split operation performed on a data block or an indirect block of a file as described above herein, the file fork split operation creates a snapshot copy (also referred to as "version" or "replica") of a buffer mapped object included in the file fork object for the primary file using the delegated reference counting mechanism. The buffer mapped entry of the snapshot file fork object is updated to point to the newly created version of the buffer mapped object.

In at least one embodiment of the current technique, the file fork split operation is performed on a buffer mapped object of a primary file fork object in a similar way as the write operation is performed on an indirect block. Referring back to FIG. 9, for example, in at least one embodiment of the current technique, upon receiving a write request for a data block cached in global data block cache 126 (such as "data block Y" 178) and included in the primary file fork object as shown in the FIG. 8, the file fork split operation creates a version of the buffer mapped object 173 by creating a version of buffer mapped object 185 using the delegated reference counting mechanism. Buffer mapped entry 183 of the snapshot file fork object 180 is updated to point to the buffer mapped object 185 which is the version or snapshot copy of the buffer mapped object 173. Further, a new GDBC descriptor entry and a new buffer cache block 190 is allocated in global data block cache 126. The newly allocated GDBC entry is associated with the newly allocated buffer cache block. Further, contents of the buffer cache block 178 are copied to the new buffer cache block 190. Further, GDBC mapping entry 174 of buffer mapped object 173 of the primary file fork object 170 is updated to refer to the new buffer cache block 190 (e.g., "data block Y'"). Additionally, GDBC mapping entry 186 of buffer mapped object 185 of snapshot file fork object 180 is updated to refer to the buffer cache block 178 which stores contents of data block "Y". Thus, buffer cache block 190 cached in the global data block cache 126 is used by file fork object 170 representing the primary file and buffer cache block 178 cached in the global data block cache 126 is used by snapshot file fork object 180 representing the snapshot of the primary file. Further, the primary file fork object 170 and the snapshot file fork 180 structures are updated to indicate that the buffer mapped object 173 is no longer shared between the primary file fork object 170 and the snapshot file fork object 180. However, the sharing relationships of buffer cache blocks that are not updated (not shown) are preserved by sharing the buffer cache blocks. The sharing relationship information (not shown in FIGS. 8-9) in the buffer mapped object 173 of the primary file fork object 170 is updated to indicate that the buffer mapped object 173 of the primary file fork object 170 is no longer shared with the snapshot file fork object 180. Further, delegated reference count 171 is updated to a full-weight value of 1,000 indicating that the buffer mapped object 173 is no longer shared. Moreover, delegated reference count 182 is updated to a value of 10 indicating that the buffer mapped entry 183 no longer shares the buffer mapped object 173, and instead points to newly created buffer mapped object 185. Thus, the total distributed weight of the buffer mapped object 185 is updated to a value of 10. Further, delegated reference count 186 is updated to a full-weight value of 10 indicating that the buffer cache block 178 (e.g., data block Y) is no longer shared. Further, delegated reference counts 175, 177 are updated to a partial-weight value of 990 indicating that sharing relationships of buffer cache blocks that are not updated (not shown) are preserved by sharing the buffer cache blocks. Similarly, delegated reference counts 187, 188 are updated to a partial-weight value of 10.

Figure 10:
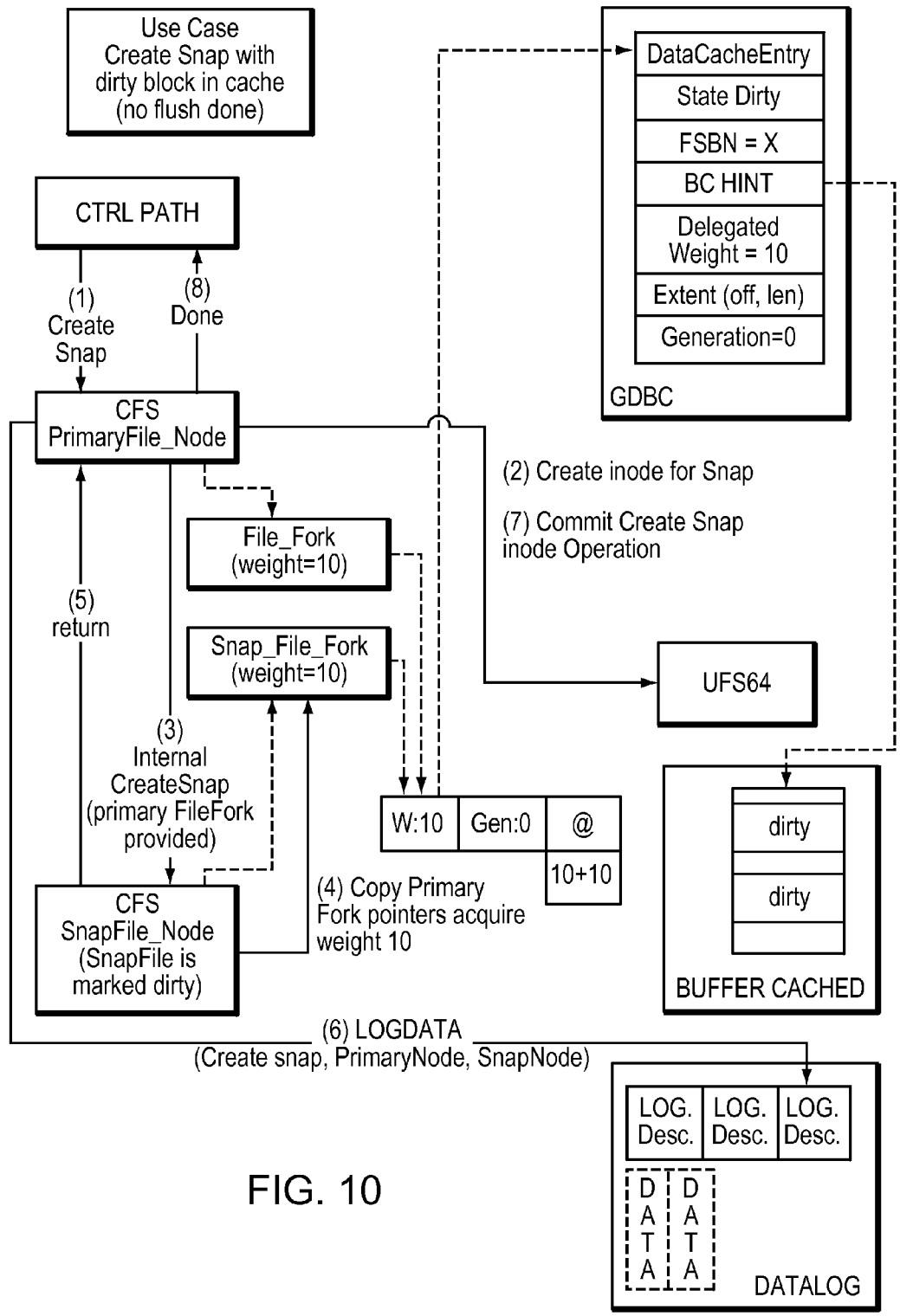

Referring to FIG. 10, shown is a detailed representation of components that may be included in an embodiment using the techniques described herein. FIG. 10 illustrates a use case scenario in which a client creates a snapshot of a file such that a portion of the file is cached in the global data block cache of a data storage system. With reference also to FIGS. 5-9, a request to create a snapshot copy of a file (also referred to as "working file") is received by file system cache management logic 128. In at least one embodiment of the current technique, an inode is created on a storage device for the snapshot copy of the working file. A snapshot file fork object is created in memory for the snapshot copy of the working file by creating a version of a file fork object associated with the working file by using the delegated reference counting mechanism described above herein. The snapshot file fork object is marked as "dirty" indicating that the snapshot copy of the working file does not include any mapping to file system data blocks on a storage device. Further, a dirty snapshot file fork object indicates that the inode of the snapshot copy of the working file does not include mapping information until a data log flush process completes the transaction of creating the snapshot copy of the file to the storage device.

In at least one embodiment of the current technique, creating a version of a file fork object associated with a working file using the delegated reference counting mechanism includes copying the contents of the file fork object (shown as "File_Fork" in FIG. 10) of the working file into a snapshot file fork object (shown as "Snap_File_Fork" in FIG. 10) of the snapshot copy of the working file. Further, delegated reference counts in the file fork object and the snapshot file fork object are updated to indicate that a set of file system data blocks cached in global data block cache 126 are shared between the file fork object and the snapshot file fork object. Further, CFS 128 sends an acknowledgement indicating successful completion of the request to create the snapshot copy of the working file. Further, a data log transaction is created and stored in data log 130 indicating the creation of snapshot file fork object. Further, the snapshot file fork object is marked as "dirty" indicating that on-disk contents of the snapshot copy of the file has not been updated yet. A data log descriptor is created that includes information regarding creation of the snapshot inode, file fork object of the working file, and snapshot file fork object of the snapshot copy. At a later time, the snapshot inode is committed to the storage device.

Figure 11:
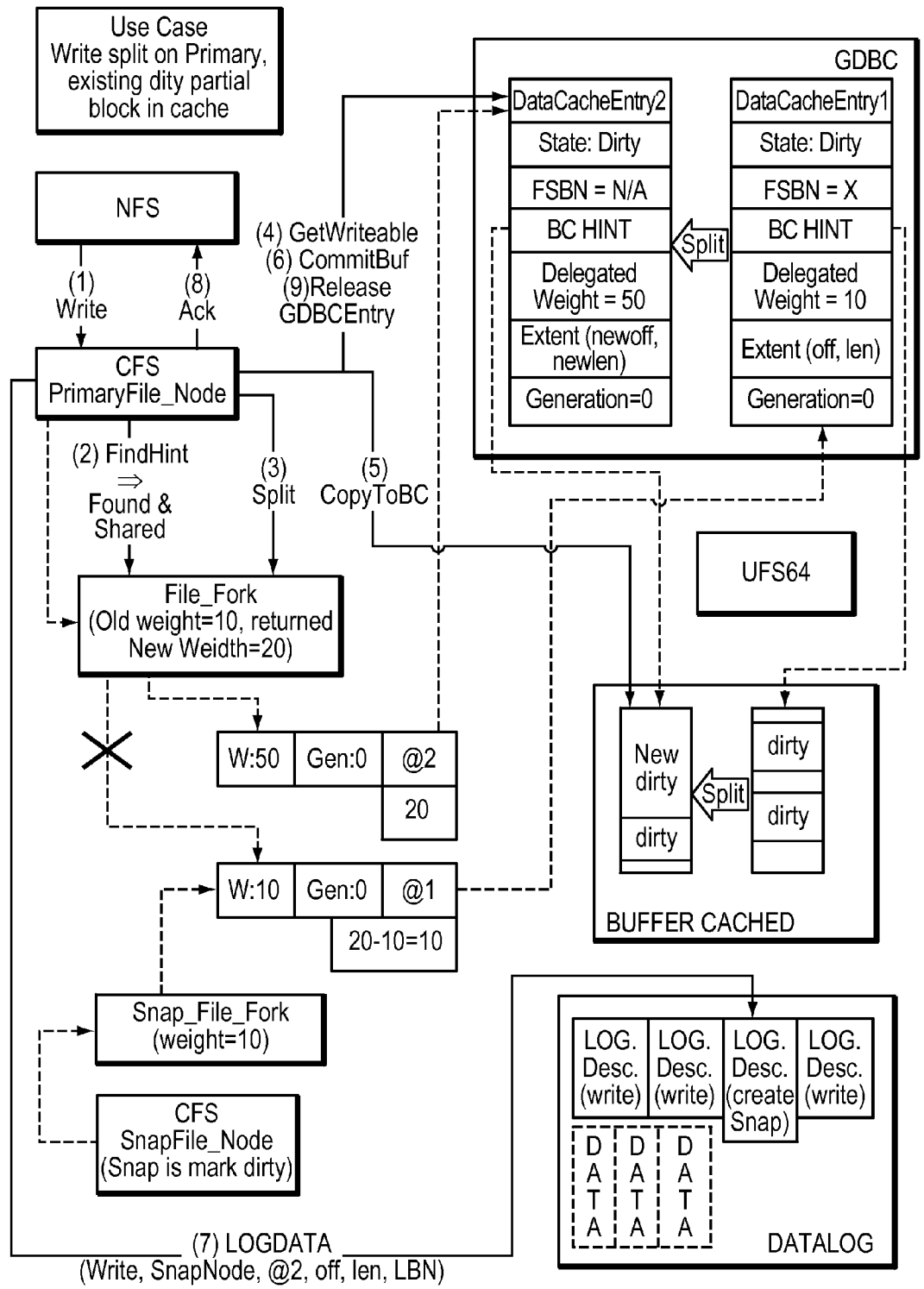

Referring to FIG. 11, shown is a detailed representation of components that may be included in an embodiment using the techniques described herein. FIG. 11 illustrates a use case scenario in which a client sends a write I/O request such that a data block to which the write operation is directed to is partially available in the global data block cache of a data storage system, is marked as a dirty buffer, and shared between a file fork object of a working file and a snapshot file fork object of a snapshot copy of the working file. With reference also to FIGS. 5-9, a client (such as a NFS client) sends a write I/O request to a data storage system. Upon receiving the write I/O request for writing data to a file of a file system at a specified file offset, the file system cache management logic ("CFS") 128 attempts to find reference (or "hint") to a data block in a file fork object associated with the file such that the data block may include the specified offset associated with the write I/O request. The CFS 128 checks the bufmap table of the file fork object by using a logical block number associated with the specified offset. Upon determining that a reference to a GDBC descriptor corresponding to the logical block number does exist in the file fork object and the GDBC descriptor indicates that a buffer cache block associated with the GDBC descriptor is shared between the file fork of the file and the snapshot file fork of the snapshot copy, a spilt operation is performed. The spilt operation (referred to herein as "file fork split") creates a version of a buffer mapped object that includes a GDBC descriptor mapping referring to the buffer cache block using the delegated reference counting mechanism as described above herein. Further, the split operation allocates a new GDBC descriptor and a new buffer cache block in global data block cache 126. Further, contents of the buffer cache block are copied to the newly allocated buffer cache block and contents of the GDBC descriptor is copied to the newly allocated GDBC descriptor. The buffer mapped object included in the file fork object is updated to point to the newly allocated buffer cache block by storing the mapping of the newly allocated GDBC descriptor which refers to the newly allocated buffer cache block. Further, CFS 128 requests a writable reference for the newly allocated buffer cache block associated with the GDBC descriptor entry included in the file fork object.

The newly allocated buffer cache block may include previous data (also referred to herein as "old data") that has been marked dirty indicating that the previous data has not been flushed to a storage device yet. CFS 128 writes the data (also referred to herein as "new data") associated with the write I/O request to the newly allocated buffer cache block. The location at which the new data is written may either be contiguous or non-contiguous to the location at which the old data is stored. A commit buffer operation is performed. The new data is marked as dirty data. Then, CFS 128 performs a data log transaction that writes the new data to a data transaction log associated with the file system. The new data is written to a section of the data transaction log. Further, a data log descriptor is created and associated with the data written to the data transaction log. The data log descriptor is associated with the newly allocated GDBC descriptor entry which refers to the newly allocated buffer cache block. Then, CFS 128 sends an acknowledgement to the client indicating successful completion of the write I/O request. Thus, on-disk contents of the file may be updated at a later time by a flush process that may execute in background asynchronous with the write I/O operation. The reference to the GDBC descriptor entry is then released.

Figure 12:
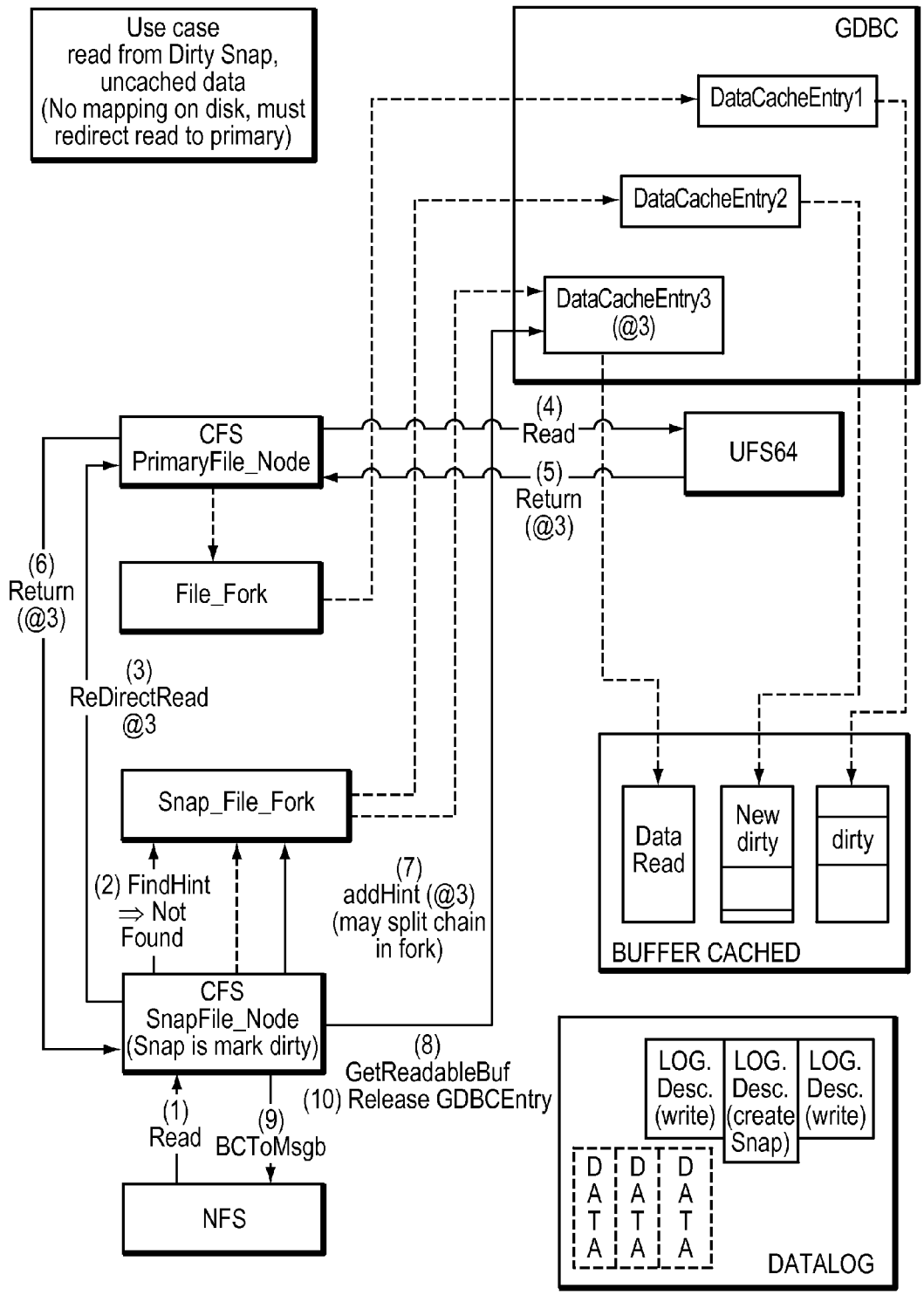

Referring to FIG. 12, shown is a detailed representation of components that may be included in an embodiment using the techniques described herein. FIG. 12 illustrates a use case scenario in which a client sends a read I/O request to a snapshot copy of a file such that data associated with the read I/O request is not cached in the global data block cache of a data storage system. With reference also to FIGS. 5-9, a client (such as a NFS client) sends a read I/O request to a data storage system. Upon receiving the read I/O request for reading data of a snapshot copy of a file of a file system at a specified file offset, the file system cache management logic ("CFS") 128 attempts to find reference (or "hint") to a data block in a snapshot file fork object associated with the snapshot copy of the file. The CFS 128 checks the bufmap table of the snapshot file fork object by using a logical block number associated with the file offset. Upon determining that an entry associated with the logical block number does not exist in the snapshot file fork object, a redirect link included in the snapshot file fork object is used to access the file fork object. Thus, in such a case, the read I/O request is redirected to the file fork object of the file. The data storage system issues a read request to file system I/O logic 124. CFS 124 first performs a mapping operation in order to determine a file system block number ("FSBN") associated with the logical block number of data that needs to be read from a storage device. Then, based on the file system block number, the file fork object examines its bufmap table to determine whether a global data block cache descriptor exists in the global data block cache 126 such that the GDBC descriptor may refer to a buffer cache block that includes data associated with the read I/O request. If no such global data block cache descriptor exists in the file fork object, a buffer cache block is allocated from the buffer cache pool provided by page manager 122. In such a case, a read I/O operation may be performed on a storage device to read the data of the file associated with the read I/O request. The data read from the storage device is written to the buffer cache block. Further, in such a case, a global data block cache descriptor entry is created in the global data block cache 126. The newly created GDBC descriptor entry is initialized by associating the buffer cache block with the GDBC descriptor entry. Further, a commit buffer operation is performed in order to update information of the GDBC descriptor entry such as an offset, a length, a file system block number and a state. The file system I/O logic 124 finishes the read I/O operation successfully by releasing resources that may have been held in order to read the data from the storage device. However, If a GDBC descriptor associated with the logical block number of data to which the read I/O request is directed to exists in the file fork object, the GDBC descriptor is used for performing the read request.

Further, information regarding the global data block cache descriptor entry is provided to file system cache management logic ("CFS") 128 which provides the information to the snapshot file fork object such that the snapshot file fork object adds a hint for the buffer cache block. Further, a file fork split operation may occur to create versions of a buffer mapped object referred to the GDBC descriptor. CFS 128 provides the buffer cache block to the client such that the client can read data from the buffer cache block. When the client finish accessing the data, the hold on the GDBC descriptor entry is released. A hold prevents a GDBC descriptor entry from being recycled by a data storage system. If the value of a hold for a GDBC descriptor entry reaches zero, the GDBC descriptor entry become eligible for recycling by a data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing snapshot in cache-based storage systems, the method comprising:
    receiving a request to create a snapshot of a data object, wherein a portion of the data object is cached in a global cache, wherein the data object is associated with a mapping object, wherein the mapping object manages access to the portion of the data object, wherein the data object is a file, wherein the file is associated with an inode stored on a persistent storage, and a file fork object stored in a memory of a cache-based storage system, wherein a file fork object of a file includes a set of buffer mapped objects, wherein each buffer mapped object of the set of buffer mapped objects includes a set of global data block cache mappings and a distributed weight for each global data block cache mapping, wherein each global data block cache mapping of the set of global data block cache mappings is associated with a global data block cache descriptor entry referring to a buffer cache object storing a data block of the file in the global cache; and
    creating a snapshot of the data object, wherein a snapshot mapping object is associated with the snapshot of the data object, wherein the snapshot mapping object includes a link to the mapping object, wherein the snapshot mapping object is a version of the mapping object and shares the portion of the data object cached in the global cache.

2. The method of claim 1, further comprising:
    receiving a write I/O request for writing data to a file, wherein a file fork object is associated with the file, wherein a snapshot file fork object is associated with a snapshot of the file;
    determining whether to allocate a new buffer cache object based on whether the file fork object includes a global data block cache mapping referring to a buffer cache object storing a data block of the file associated with an offset at which to write the data of the file, wherein the data block cached in the global cache and is shared by the file and the snapshot of the file;
    based on the determination, creating a copy of a buffer mapped object of the file fork object, wherein the buffer mapped object includes a reference to the global data block cache mapping;
    based on the determination, updating the snapshot file fork object to refer to the copy of the buffer mapped object;
    based on the determination, updating the buffer mapped object to refer to the new buffer cache object; and
    writing data to the new buffer cache object.

3. The method of claim 1, further comprising:
    receiving a read I/O request for reading data of a snapshot of a file, wherein a file fork object is associated with the file, wherein a snapshot file fork object is associated with the snapshot of the file;
    determining whether to use a redirect link of the snapshot file fork object for accessing the file fork object of the file based on whether the snapshot file fork object includes a global data block cache mapping referring to a buffer cache object storing the data;
    based on the determination, redirecting the read I/O request to the file fork object of the file;
    based on the redirection, determining whether to allocate a buffer cache object based on whether the file fork object includes a global data block cache mapping referring to a buffer cache object storing the data;
    based on the determination, reading the data of the file from a storage device into the buffer cache object; and
    providing the buffer cache object for completing the read I/O request.

4. The method of claim 1, further comprising:
    creating a snapshot inode on the persistent storage for the snapshot of the data object; and
    creating a snapshot file fork object for the snapshot of the data object.

5. The method of claim 1, wherein the mapping object is a file fork object, wherein the file fork object includes a distributed weight for sharing the portion of the data object with the snapshot mapping object, wherein the snapshot mapping object is a snapshot file fork object.

6. The method of claim 1, wherein the global cache includes a set of global data block cache descriptors for storing information for a set of buffer cache objects stored in a volatile memory of a cache-based storage system, wherein a global data block cache descriptor of the set of global data block cache descriptors is associated with a buffer cache object of the set of buffer cache objects, wherein a buffer cache object stores a data block of a file of a file system.

7. The method of claim 1, further comprising:
    associating a file with a file fork object, wherein a data block of the file is stored in a buffer cache object, wherein the buffer cache object is associated with a global data block cache descriptor of the global cache, wherein the global data block cache descriptor is accessed by the file fork object; and associating a snapshot of the file with a snapshot file fork object, wherein the snapshot file fork object accesses the buffer cache object by using a redirect link included in the snapshot file fork object, wherein the redirect link refers to the file fork object, wherein the data block is shared by the file and snapshot of the file.

8. A system for use in managing snapshot in cache-based storage systems, the system comprising:

a processor;

first logic receiving a request to create a snapshot of a data object, wherein a portion of the data object is cached in a global cache, wherein the data object is associated with a mapping object, wherein the mapping object manages access to the portion of the data object, wherein the data object is a file, wherein the file is associated with an inode stored on a persistent storage, and a file fork object stored in a memory of a cache-based storage system, wherein a file fork object of a file includes a set of buffer mapped objects, wherein each buffer mapped object of the set of buffer mapped objects includes a set of global data block cache mappings and a distributed weight for each global data block cache mapping, wherein each global data block cache mapping of the set of global data block cache mappings is associated with a global data block cache descriptor entry referring to a buffer cache object storing a data block of the file in the global cache; and second logic creating a snapshot of the data object, wherein a snapshot mapping object is associated with the snapshot of the data object, wherein the snapshot mapping object includes a link to the mapping object, wherein the snapshot mapping object is a version of the mapping object and shares the portion of the data object cached in the global cache.

9. The system of claim 8, further comprising:

third logic creating a snapshot inode on the persistent storage for the snapshot of the data object; and fourth logic creating a snapshot file fork object for the snapshot of the data object.

10. The system of claim 8, further comprising:

third logic receiving a write I/O request for writing data to a file, wherein a file fork object is associated with the file, wherein a snapshot file fork object is associated with a snapshot of the file;

fourth logic determining whether to allocate a new buffer cache object based on whether the file fork object includes a global data block cache mapping referring to a buffer cache object storing a data block of the file associated with an offset at which to write the data of the file, wherein the data block cached in the global cache and is shared by the file and the snapshot of the file;

fifth logic creating, based on the determination, a copy of a buffer mapped object of the file fork object, wherein the buffer mapped object includes a reference to the global data block cache mapping;

sixth logic updating, based on the determination, the snapshot file fork object to refer to the copy of the buffer mapped object;

seventh logic updating, based on the determination, the buffer mapped object to refer to the new buffer cache object; and eighth logic writing data to the new buffer cache object.

11. The system of claim 8, further comprising:

third logic receiving a read I/O request for reading data of a snapshot of a file, wherein a file fork object is associated with the file, wherein a snapshot file fork object is associated with the snapshot of the file;

fourth logic determining whether to use a redirect link of the snapshot file fork object for accessing the file fork object of the file based on whether the snapshot file fork object includes a global data block cache mapping referring to a buffer cache object storing the data;

fifth logic redirecting, based on the determination, the read I/O request to the file fork object of the file;

sixth logic determining, based on the redirection, whether to allocate a buffer cache object based on whether the file fork object includes a global data block cache mapping referring to a buffer cache object storing the data;

seventh logic reading, based on the determination, the data of the file from a storage device into the buffer cache object; and eighth logic providing the buffer cache object for completing the read I/O request.

12. The method of claim 4, further comprising:

storing a transaction in a journal, wherein the transaction includes information associated with creating the snapshot of the file.

13. The system of claim 9, further comprising:

fifth logic storing a transaction in a journal, wherein the transaction includes information associated with creating the snapshot of the file.

14. The system of claim 8, wherein the mapping object is a file fork object, wherein the file fork object includes a distributed weight for sharing the portion of the data object with the snapshot mapping object, wherein the snapshot mapping object is a snapshot file fork object.

15. The system of claim 8, wherein the global cache includes a set of global data block cache descriptors for storing information for a set of buffer cache objects stored in a volatile memory of a cache-based storage system, wherein a global data block cache descriptor of the set of global data block cache descriptors is associated with a buffer cache object of the set of buffer cache objects, wherein a buffer cache object stores a data block of a file of a file system.

16. The system of claim 8, further comprising:

third logic associating a file with a file fork object, wherein a data block of the file is stored in a buffer cache object, wherein the buffer cache object is associated with a global data block cache descriptor of the global cache, wherein the global data block cache descriptor is accessed by the file fork object; and fourth logic associating a snapshot of the file with a snapshot file fork object, wherein the snapshot file fork object accesses the buffer cache object by using a redirect link included in the snapshot file fork object, wherein the redirect link refers to the file fork object, wherein the data block is shared by the file and snapshot of the file.

* * * * *